United States Patent
Westrich et al.

(10) Patent No.: US 10,718,682 B2
(45) Date of Patent: Jul. 21, 2020

(54) METHOD FOR CALIBRATING AT LEAST ONE SENSOR, IN PARTICULAR A PRESSURE SENSOR, HAVING AT LEAST ONE SIGNAL-CONDUCTING CONNECTION TO AT LEAST ONE SIGNAL CONVERTER

(71) Applicant: Hella KGaA Hueck & Co., Lippstadt (DE)

(72) Inventors: Marc Westrich, Ritterhude (DE); Heiko Dobrinski, Bremen (DE); Bastian Kanning, Bremen (DE)

(73) Assignee: Hella KGaK Hueck & Co., Lippstadt (DE)

( * ) Notice: Subject to any disclaimer, the term of this patent is extended or adjusted under 35 U.S.C. 154(b) by 103 days.

(21) Appl. No.: 16/032,551

(22) Filed: Jul. 11, 2018

(65) Prior Publication Data
US 2018/0321106 A1 Nov. 8, 2018

Related U.S. Application Data

(63) Continuation-in-part of application No. 15/016,955, filed on Feb. 5, 2016, now Pat. No. 10,048,155.

(30) Foreign Application Priority Data

Feb. 5, 2015 (DE) .......................... 10 2015 001 500

(51) Int. Cl.
G01L 27/00 (2006.01)
G01D 18/00 (2006.01)

(52) U.S. Cl.
CPC .......... *G01L 27/002* (2013.01); *G01D 18/008* (2013.01)

(58) Field of Classification Search
CPC .............................. G01D 18/09; G01L 27/002
See application file for complete search history.

(56) References Cited

U.S. PATENT DOCUMENTS 4,724,707 A * 2/1988 Innerhofer ............ G01L 9/0026
73/384
5,033,284 A 7/1991 Belt et al.
(Continued)

FOREIGN PATENT DOCUMENTS

DE 3936138 A1 5/1990
DE 10035816 A1 1/2002
(Continued)

OTHER PUBLICATIONS

Machine Translation of RU 2014137783 A1, which originally published on Apr. 10, 2016 (Year: 2016).*
(Continued)

*Primary Examiner* — David A Rogers
(74) *Attorney, Agent, or Firm* — Muncy, Geissler, Olds & Lowe, P.C.

(57) ABSTRACT

In a method for calibrating at least one sensor having at least one signal-conducting connection to at least one signal converter, a sensor characteristic is recorded by the determination of at least one measurand at at least two different temperatures, the extent of the influence of a further value influencing the sensor is determined from the sensor characteristic by means of a functional relation, the extent of the influence of the further influencing value is considered in the calibration and the influence of the further influencing value is balanced in the calibration. As a result, the influence of a further influencing value acting on the sensor is corrected. The sensor can be a structure borne sound sensor which may have a membrane with a sensor element arranged on the membrane. Vibrations on the membrane can be captured by the sensor element, such as a piezoresistive element.

6 Claims, 2 Drawing Sheets

(56) References Cited

U.S. PATENT DOCUMENTS

| | | | | | |
|---|---|---|---|---|---|
| 5,361,218 | A | * | 11/1994 | Tripp | G01K 15/00 |
| | | | | | 374/E15.001 |
| 5,394,345 | A | * | 2/1995 | Berard | G01L 9/0022 |
| | | | | | 374/143 |
| 5,902,933 | A | * | 5/1999 | Bingo | G01L 9/125 |
| | | | | | 361/283.4 |
| 5,978,743 | A | * | 11/1999 | Kiyono | G01D 18/00 |
| | | | | | 340/870.05 |
| 6,374,191 | B1 | * | 4/2002 | Tsuchiya | G01L 27/002 |
| | | | | | 702/104 |
| 7,231,312 | B2 | * | 6/2007 | Tanizawa | G01R 33/072 |
| | | | | | 702/130 |
| 8,746,073 | B2 | * | 6/2014 | Getman | G01L 9/125 |
| | | | | | 73/708 |
| 9,131,896 | B2 | * | 9/2015 | Burger | A61B 5/031 |
| 2014/0019052 | A1 | * | 1/2014 | Zaeper | G01V 11/002 |
| | | | | | 702/8 |

FOREIGN PATENT DOCUMENTS

| | | | |
|---|---|---|---|
| DE | 102006058269 B4 | | 9/2010 |
| RU | 2014137783 A1 | * | 4/2016 |
| WO | WO-2010/003432 A1 | | 1/2010 |

OTHER PUBLICATIONS

Zarnk et al., "The Effect of Humidity on the Stability of LTCC Pressure Sensors", Metrology and Measurement Systems, vol. 19, No. 1, Mar. 12, 2012. (Year: 2012).*

* cited by examiner

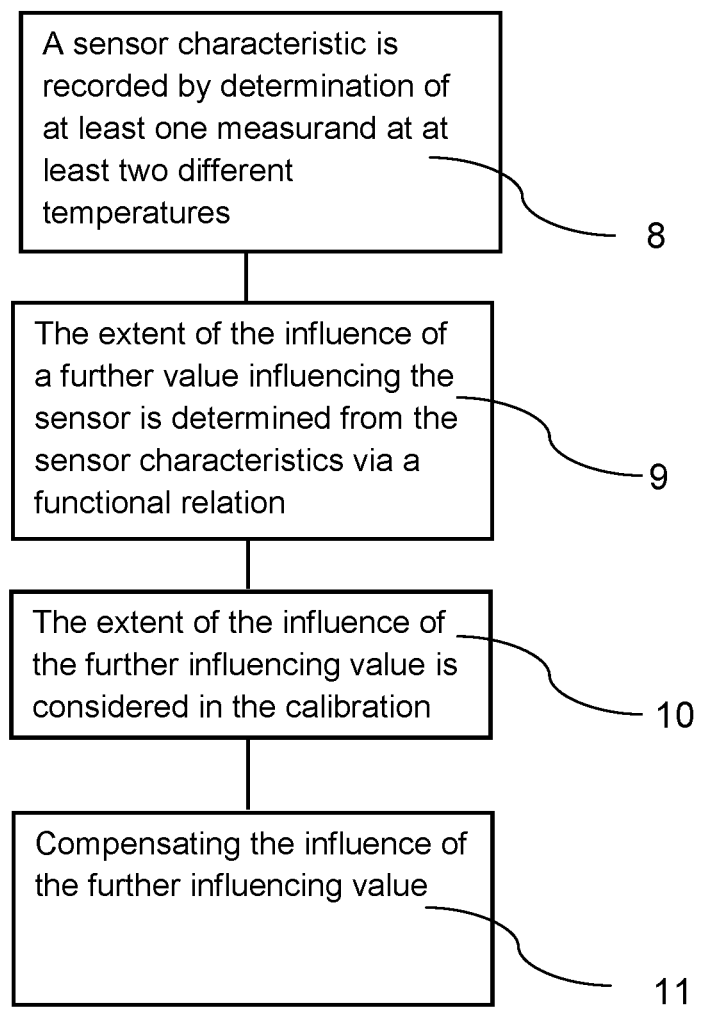

METHOD FOR CALIBRATING AT LEAST ONE SENSOR, IN PARTICULAR A PRESSURE SENSOR, HAVING AT LEAST ONE SIGNAL-CONDUCTING CONNECTION TO AT LEAST ONE SIGNAL CONVERTER

CROSS-REFERENCE TO RELATED APPLICATIONS

This application is a Continuation-in-Part of co-pending application Ser. No. 15/016,955 filed on Feb. 5, 2016, for which priority is claimed under 35 U.S.C. § 120; and this application claims priority of Application No. 10 2015 001 500.1 filed in Germany on Feb. 5, 2015 under 35 U.S.C. § 119; the entire contents of all of which are hereby incorporated by reference.

BACKGROUND OF THE INVENTION

Field of the Invention

The invention relates to a method for calibrating at least one sensor, having at least one signal-conducting connection to at least one signal converter.

The calibration of sensors is required for outputting exact values by the sensor. A standard method for calibrating a sensor or also another measuring device provides that known reference values of the measurand to be determined are provided to the sensor, to which the sensor is then correspondingly set.

Brief Description of the Related Art

For example DE 01 2006 058 269 D4 describes a method for calibrating at least one pressure sensor. Here, the pressure sensor to be calibrated comprises at least one membrane. First, a process pressure applied to the membrane is measured by the pressure sensor. Said process pressure is superposed with an additional pressure and the pressure resulting at the membrane is measured. Here, essentially the magnitude of the pressure, by means of which the process pressure is superposed, is to be equal to the measured process pressure. The resulting pressure value is compared to a preset setpoint value, wherein the preset setpoint value essentially is to be equal to zero. The deviation between the setpoint value and the measured superposed pressure value is determined and used for calibration.

This comes with the disadvantage that, e.g. in the case of a factory-provided calibration, influence of influencing values acting on the sensor after calibration cannot be considered. For example, sensors which are in a dry state directly after production and which are calibrated in said state may systemically indicate wrong values after absorbing humidity, e.g. air humidity. Mostly, calibration after removal of moisture is not reasonable from an economic point of view since absorption of humidity often times is a slow process with a saturation time of several days and thus the later calibration takes too long for the production process.

SUMMARY OF THE INVENTION

It is the object of the invention to provide a method for calibrating a sensor in which influences of a further influencing value acting on the sensor can be corrected.

Said object is achieved by means of a method having the features of the present claims. Further developments and advantageous embodiments are indicated in the respective sub claims.

In a method for calibrating at least one sensor having at least one signal-conducting connection to at least one signal converter, it is provided according to the invention that a sensor characteristic is recorded by determination of at least one measurand at at least two different temperatures, that the extent of the influence of a further value influencing the sensor is determined from the sensor characteristics via a functional relation, that the extent of the influence of the further influencing value is considered in the calibration and that the influence of the further influencing value is compensated.

The sensor can be a piezo-resistive pressure sensor, for example, which is used for determining the pressure and/or the temperature of an engine oil in an engine, for example. The pressure applied by the engine oil is transformed in the sensor to a digital equivalent value, e.g. by means of an integrated circuit. In consideration of the prevailing temperature, the digital equivalent value can be calculated into the correct value of the pressure, e.g. in the measurement unit bar. A corresponding measuring signal can be output as a pulse width modulation signal, for example.

Furthermore the sensor can be a structure borne sound sensor. A structure borne sound sensor might have a membrane, in particular a plastic membrane with a sensor element arranged on the membrane. Vibrations, propagating on the membrane, can be captured by the sensor element. The sensor element can for example be a piezoresistive element, by which the vibrations can be detected. For an accurate capture of the vibrations, a consistent resonance frequency of the membrane is required. The captured vibrations can for example be transformed by means of an electrical circuit in digital equivalents values.

Calibration of sensors may be required due to production-caused variations of the sensors, for example, which are reflected in fluctuations in the digital equivalent values of the parameter.

Values of at least one measurand, e.g. a pressure or a vibration, at at least two different temperatures are recorded for determining a sensor characteristic. For example, digital equivalent values of two or three applied reference values, for example reference pressures or reference vibrations can be determined at three different temperatures. Additionally, the digitally equivalent values relative for the three reference temperatures can be determined. Said digitally equivalent values, referred to as raw values, serve as calibration input data. The input data may also include the reference temperatures and the reference measurement values. The output data of this calibration can be constant parameters which are stored in the integrated circuit, for example. Said parameters can be considered as coefficients in a mathematical function for conversion of the digital equivalent values of the respective measurands into the correct output values of the sensor. In case of the pressure sensor the mathematical function can be a polynomial. An incorrect conversion of the digital equivalent values into the respective correct output values may result from the influence of further influencing values such as the humidity. For example, pressure raw values in the dry state may exhibit a parabolic course depending on the temperature. The raw values can be approximated by a polynomial. However, a different parabola is required for the approximation of the raw values after a moisture influence of the sensors than in the dry state. For investigation of this issue, for example a significant selection of identically constructed dry sensors can be considered in a wet state and the respective measurement raw values of the sensors measured by the sensors can be recorded depending on the temperature during drying of the sensors. An optimum characteristic line, e.g. a parabola, can be determined from the plurality of temperature-depending curves of measurement raw values, which parabola may be located on average between the curves of the humid state and the dry state, for example. By means of this averaging process, prevention may be effected against the influence of the further influence value, in particular of moisture, so that deviations of the raw data by approximation with a wrong parabola become so small that the output values of the sensors are in the tolerance range of the sensor.

For example the membrane of a structure borne sound sensor, in particular the resonance frequency of the plastic membrane, can be affected by moisture. The resonance frequency has an influence to the sensitivity of the sensor. By the calibration process at different temperatures prevention may be effected against the influence of moisture.

The extent of the influence of the further influencing value, humidity for example, on a sensor can be determined from the distance of the measurement raw value curve in the dry state to the averaged optimum raw value curve. Determination of the distances between the two measurement values curves can be effected at three different temperatures, for example. In order to not have to perform this method for every sensor to be calibrated, the extent of the influence of the further influencing value can be determined form a sensor characteristic, such as the temperature sensitivity of the raw values.

For this purpose, the secant of a raw value curve of a sensor is determined between at least two temperature values. The slope of this secant indicates the sensitivity of the measuring signal relative to a change in temperature. This concept is referred to as sensitivity.

By means of the significant selection of sensors, a linear relation between the sensitivity and the extent of the influence of humidity at the different temperatures was found. That means that the extent of the influence of the humidity can be concluded from the sensitivity that can be determined from the sensor characteristic in a simple manner. This way, a compensation of the humidity influence can be calculated depending on the sensitivity. For example the pressure raw values measured for calibration of each sensor are corrected in direction of the optimum averaged parabola by means of linear transformations which have been determined based on the significant selection of sensors. The linear equations of the linear transformation indicate the distance to the optimum parabola at ambient pressure at the respective temperature for the sensitivity of a sensor. Hence, determination of the sensitivity of each individual sensor is sufficient for determining the corrective transformation. At the calibration of pressure sensors a polynomial can be calculated from the corrected raw data. The coefficients of the calculated polynomial are stored and are used in the conversion of the digital equivalent values of the measurand into the correct output values.

In a further development of the method, the extent of the influence of the further influencing value corresponds to the intervals of the raw values of the measurand recorded by the sensor for respective averaged values on a predetermined characteristic line at at least two temperature values. For example, the averaged values can be obtained from a significant selection of identically constructed sensors, the raw values of which are recorded under the influence of a further influencing value. The further influencing value can be humidity, e.g. air humidity. For example, the raw values, in particular the pressure raw values can be recorded in a plurality of identically constructed sensors in a humid state while the sensors are dried. An optimum characteristic line, for example a parabola in the example of the pressure raw values, can be determined from this data, which characteristic curve is on average between the measurement raw values of the sensors in the humid and in the dry state. The extent of the influence of the humidity on the sensor can be determined by determination of the distance of the raw data line of a sensor to the averaged characteristic line.

In a further development of the method, the secant of the raw values on a functional graph of the measurand is calculated between at least two temperature values, the slope of the secant is determined and the sensitivity of the raw values of the measurand to changes in temperature is concluded from the slope of the secant. For example, the raw values, for example the pressure raw values of a sensor to be calibrated can be recorded in a range between 20° C. to 170° C. The secant can then be determined between two temperature points, e.g. between 40° C. and 130° C., from said temperature-depending raw values, for example the pressure raw value curve. The slope of this secant is determined. The slope indicates the sensitivity of the measurement raw signal to the temperature change of the pressure raw signal. This responsitivity to the temperature change is referred to as sensitivity.

In a further development of the method a linear relation is assumed between the extent of the influence of the further influencing value and the sensitivity of the raw values of the measurand to changes in temperature. The study of a plurality of identically constructed sensors leads to the conclusion that there is a correlation between the sensibility of the of the raw value signal, for example the pressure raw value signal to the temperature change, hence the sensitivity, and the extent of the influence of the further influencing value, i.e. the humidity, for example. A strong linear relation between the sensitivity and the importance of influence of the humidity can be concluded from this correlation. Said linear relation can for example be determined by averaging the measuring results of a plurality of identically constructed sensors at two temperature points, e.g. 40° C. and 80° C., for example. The linear relation at these two temperature points can e.g. in each case be expressed by a linear transformation, e.g. in the form of a sensitivity-depending linear equation.

In a further development of the method, a compensation of the influence of the further influence value in the calibration is calculated depending on the temperature sensitivity of the measurand and the raw values are shifted in direction of the predetermined characteristic line for compensating the influence. Linear transformation for different temperature points can be determined by correlation of the sensitivity of the measurement raw values to temperature changes with the extent of the influence of the further influencing value by evaluation of a plurality of identically constructed sensors. By means of said linear transformations, the measured measurement raw values of a sensor can be shifted in direction of the characteristic line averaged for a plurality of identically constructed sensors. By shifting the measurement raw values in direction of the averaged characteristic line, prevention is effected against the influence of the humidity. Deviations of the raw values caused by the influence of humidity are thus compensated such that the measurement raw values can be correctly interpreted by the sensor and thus the output data of the sensor is within the precision tolerances. In case of pressure sensors the measurement raw values can be pressure raw values. In the case of structure borne sound sensors the measurement raw values can be vibration raw values.

In a further development of the method, the correction of the raw values in direction of the predetermined characteristic line is effected by means of at least one linear transformation, which indicates the distance to the predetermined characteristic line at at least one temperature for at least one sensitivity value. The linear transformations are determined by means of a significant selection of identically constructed sensors and depend on the respective sensitivity values. The linear equations at the respective temperature value are thus preset so that the sensitivity of the raw values to the temperature change is to be determined only for the calibration of one sensor by determining the slope of the secant from the sensor characteristics.

In a further development of the method, the predetermined characteristic line is an averaged characteristic line of raw values of the measurand at a varying temperature, which is determined at a plurality of identically constructed sensors, wherein the characteristic lines are recorded while wet sensors are drying and the average value of the characteristic lines is determined. In terms of production, it is favorable to calibrate sensors directly after production, i.e. in dry state. By using the sensors at normal atmospheric pressure, the sensors are exposed to air humidity. Humidity has an influence on the conversion of the digital equivalent measuring values into the correct output values, for example in the measurement unit bar or ° C. or the output of the correct vibration amplitude. In order to compensate inaccuracy during conversion, a plurality of identically constructed sensors is examined in the wet state while drying. Characteristic lines are generated from the respective measured measurement raw values, wherein an averaged characteristic lines between the humid state and the dry state is calculated. By means of said averaged characteristic line, prevention of the raw values measured by the sensor is made against the influence of humidity.

In one embodiment of the invention, there is a functional relation between the measured raw values and the output values of the sensor via an at least first-order polynomial. The input data considered in the calibration are the raw values, i.e. the digital equivalents of the measurands, for example the digital equivalents of the measured pressure values, the digital equivalents of the temperature as well as of the reference temperatures and the reference pressure values. The raw values are transformed by the linear transformations, namely shifted in direction of the averaged linear characteristic line. This transformed data represent the initial data for the calibration. For example in the case of pressure sensors a polynomial can be calculated from the transformed values and the coefficient of this polynomial are stored in the integrated circuit as constant parameters. During later operation of the sensor, the raw values of the physical input values, for example of the pressure or the temperature, are converted into the respective values in bar and ° C. by means of a polynomial. Here, the coefficients calculated from the transformed raw values during calibration, which have been stored in the integrated circuit, are used as coefficients in this polynomial. In order that the conversion of the raw values into the respective values in bar and ° C. is effected properly, the influence of humidity must be extracted by shifting the raw value curve in direction of the averaged curve.

BRIEF DESCRIPTION OF THE DRAWINGS

One embodiment of the invention, from which further inventive features result, is shown in the drawing. The drawing shows in:

FIG. 2 illustrates a method according to embodiment of the invention.

DETAILED DESCRIPTION OF THE PREFERRED EMBODIMENTS

Figure 1:
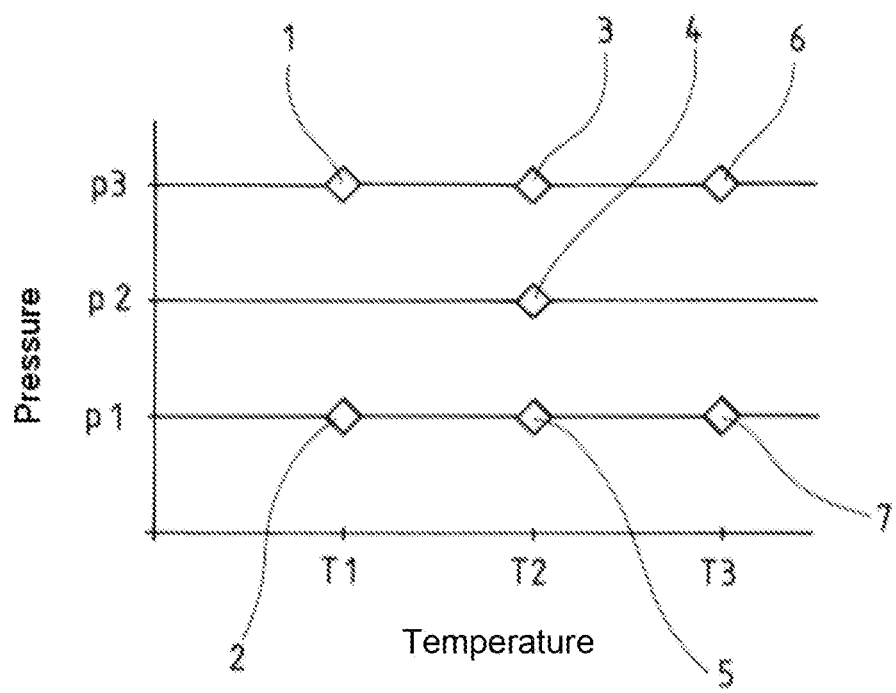
FIG. 1 illustrates a schematic graphic illustration of the measured raw values.

FIG. 1 shows the digital equivalents of the measurand, for example the pressure, at different temperatures in an exemplary manner. Here, at temperature T1 once pressure P1 and once pressure P3 were applied, leading to the record of digital equivalents 1 and 2 for the respective pressures measured. At temperature T2, the three different pressures P1, P2 and P3 were applied, for which the respective digital equivalents 3, 4 and 5 were recorded. Accordingly, at T3 the equivalents 6 and 7 for the pressures P1 and P3 were recorded. The digital equivalents are also referred to as raw values. In addition to the digital equivalents of the measurand of the pressure, the digital equivalents of the temperatures, the reference temperatures T1, T2 and T3 as well as digital equivalents of the reference pressures P1, P2 and P3 are considered in the calibration. Thus, in this case, seven digital equivalents 1-7 of the pressure, three reference pressures, three digital equivalents of the temperature and three reference temperatures are considered as input data. Seven constant parameters are calculated as output data of the calibration. From the transformed raw values a polynomial is calculated and the coefficient of the polynomial are stored in the integral circuit. During operation of the sensor, the digital equivalents of the physical input variables of the pressure and the temperature are converted into the respective values in bar and ° C. by means of a second-order polynomial. The parameters calculated during calibration are used as coefficients in this polynomial.

FIG. 2 illustrates a method according to an embodiment of the present invention. Specifically, values of at least one measurand, e.g. a pressure or a vibration, at at least two different temperatures are recorded for determining a sensor characteristic (8). An optimum characteristic line, e.g. a parabola in the case of pressure, can be determined from the plurality of temperature-depending curves of pressure raw values, which parabola may be located on average between the curves of a humid state and a dry state, for example. The extent of the influence of the further influencing value, humidity for example, on a sensor can be determined from the distance of the pressure raw value curve in the dry state to the averaged optimum raw value curve. Determination of the distances between the two curves, e.g. pressure curves, can be effected at three different temperatures, for example. In order to not have to perform this method for every sensor to be calibrated, the extent of the influence of the further influencing value can be determined form a sensor characteristic, such as the temperature sensitivity of the pressure raw values (9).

For this purpose, the secant of a raw value curve of a sensor is determined between at least two temperature values. The slope of this secant indicates the sensitivity of the measuring signal, here for example the sensitivity of the pressure signal relative to a change in temperature. This concept is referred to as sensitivity.

By means of the significant selection of sensors, a linear relation between the sensitivity and the extent of the influence of humidity at the different temperatures was found. That means that the extent of the influence of the humidity can be concluded from the sensitivity that can be determined from the sensor characteristic in a simple manner. This way, a compensation of the humidity influence can be calculated depending on the sensitivity (11). For example the pressure raw values measured for calibration of each sensor are corrected in direction of the optimum averaged parabola by means of linear transformations which have been determined based on the significant selection of sensors (10).

All features indicated in the above description and in the claims can be combined in any selection with the features of the independent claim. The disclosure of the invention is thus not limited to the described or claimed feature combinations, rather all reasonable feature combinations disclosed within the scope of the invention are to be considered as disclosed.

The invention claimed is:

1. A method for calibrating at least one structure borne sound sensor with a membrane and a sensor element arranged on the membrane having at least one signal-conducting connection to at least one signal converter, wherein a sensor characteristic is recorded by the determination of at least one measurand at at least two different temperatures, the extent of the influence of a further value influencing the sensor is determined from the sensor characteristics via a functional relation, the extent of the influence of the further influencing value is considered for calibration, the influence of the further influencing value is compensated in the calibration;

the extent of the influence of the further influencing value corresponds to the intervals of the raw values of the measurand recorded by the sensor for corresponding averaged values located on a predetermined characteristic curve at at least two temperature values; and the predetermined characteristic curve is an averaged characteristic curve of the raw values (1-7) of the measurand at a varying temperature which is determined at a selection of identically constructed sensors, wherein the respective characteristic curves are recorded when wet sensors are drying and the average value of the characteristic curves is determined.

2. The method according to claim 1, wherein the secant of the raw values of the measurand located on a functional graph is calculated between at least two temperature values, the slope of the secant is determined and that the sensitivity of the raw values of the measurand to a temperature change is concluded from the slope of the secant.

3. The method according to claim 1, wherein a linear relation is assumed between the extent of the influence of the further influencing value and the sensitivity of the raw values of the measurand to a temperature change.

4. The method according to claim 1, wherein the further value influencing the sensor is humidity acting on the sensor.

5. The method according to claim 1, wherein a compensation of the influence of the further influencing value is calculated in the calibration depending on the sensitivity of the measurand to temperature changes and that the raw values are shifted in direction of the predetermined characteristic curve for compensating the influence.

6. The method according to claim 5, wherein the correction of the raw values in direction of the predetermined characteristic curve is effected by means of at least one linear transformation which indicates the distance to the predetermined characteristic curve for at least one sensitivity value at at least one temperature.

* * * * *